United States Patent [19]
Stein

[11] Patent Number: 5,890,420
[45] Date of Patent: Apr. 6, 1999

[54] APPARATUS FOR DISCONTINUOUS PREPARATION OF FARINACEOUS PRODUCTS

[76] Inventor: Hans-Ulrich Stein, Vis Terragglo 8, 6949, Comano, Switzerland

[21] Appl. No.: 875,793
[22] PCT Filed: Dec. 27, 1995
[86] PCT No.: PCT/EP95/05135
  § 371 Date: Jul. 14, 1997
  § 102(e) Date: Jul. 14, 1997
[87] PCT Pub. No.: WO96/21383
  PCT Pub. Date: Jul. 18, 1996

[30] Foreign Application Priority Data

Jan. 14, 1995 [DE] Germany .................. 195 00 973.8

[51] Int. Cl.⁶ .................. A23L 1/00; A47J 19/00; A47J 27/00; G01F 11/00
[52] U.S. Cl. .................. 99/407; 99/330; 99/352; 99/403
[58] Field of Search .................. 99/330–334, 352–355, 99/357, 403, 407, 410, 443 R, 443 C; 221/75, 150 HC, 150 A, 150 R; 426/507, 509, 113, 403, 523, 557

[56] References Cited

U.S. PATENT DOCUMENTS 3,928,045  12/1975  Tsunoda et al. .................. 99/330
4,543,878  10/1985  Luchetti .................. 99/407 X
4,803,916  2/1989   Tacconi .................. 99/352
4,869,160  9/1989   Pratolongo .................. 99/403 X
4,979,435  12/1990  Hayashi et al. .................. 99/357 X
5,010,806  4/1991   Narcisi et al. .................. 99/357

FOREIGN PATENT DOCUMENTS 0296549  12/1988  European Pat. Off. .
9317939   2/1994  Germany .
9214391   9/1992  WIPO .

*Primary Examiner*—Timothy F. Simone
*Attorney, Agent, or Firm*—Dick and Harris

[57] ABSTRACT

An apparatus for the discontinuous preparation of farinaceous products such as spaghetti with a portioning apparatus for receiving the farinaceous products, a cooking chamber and a drainage chamber, with the inlet zone and the outlet zone of the cooking chamber and the drainage chamber each being closeable by valves which are arranged as flaps, with a single flap which is rotatable about a rotational axle being provided between the cooking chamber and the drainage chamber, and with the flaps in the inlet zone of the cooking chamber and the outlet zone of the drainage chamber being movable transversally to the inlet zone or the outlet zone.

17 Claims, 8 Drawing Sheets

APPARATUS FOR DISCONTINUOUS PREPARATION OF FARINACEOUS PRODUCTS

BACKGROUND OF THE INVENTION

1. Field of the Invention

The invention relates to an apparatus for the discontinuous preparation of farinaceous products such as spaghetti or the like, with a portioning apparatus for receiving the raw farinaceous products, a cooking chamber and a drainage chamber, with the inlet and the outlet of the cooking chamber and the drainage chamber each being closeable by valves which are arranged as flaps, with a single flap which is rotatable about a rotational axle being provided between the cooking chamber and the drainage chamber, and with the flaps in the inlet zone of the cooking chamber and the outlet zone of the drainage chamber being movable transversally to the inlet zone or the outlet zone.

2. Description of the Prior Art

Apparatuses for the discontinuous preparation of portioned farinaceous products are known in many arrangements. They are used to prepare a portioned quantity of raw farinaceous products in the shortest possible time and therefore are used in respective automatic machines. Such a known apparatus is described in WO 90/04345. Raw farinaceous products disposed above the cooking chamber are given into the cooking chamber in a portioned way, the cooking chamber is closed and the farinaceous products are cooked under a predetermined temperature and under a respective pressure in a relatively short period of time. Thereafter the cooked farinaceous products leave the cooking chamber with the cooking water and are relieved of the water in an adjacent drainage chamber. Finally, the output is made in a suitable container such as a plate, for example.

The cooking chamber is closed in its inlet and outlet zone by a ball valve which on the one hand allows the filling and emptying of the cooking chamber and on the other hand guarantees a secure sealing of the cooking chamber during the cooking process. An a result of the relatively high friction of ball valves, they are highly sluggish and their drive therefore requires a certain amount of force, so that usually pneumatic drives are employed. Ball valves have the additional disadvantage that they have a relatively large overall height and thus further increase the total height of the aforementioned apparatus. Finally, the use of a ball valve in the outlet zone of the cooking chamber is not optimal, because the (cooked and sensitive) farinaceous products can be damaged while passing the ball valve.

Moreover, an apparatus for the discontinuous preparation of portionied farinaceous products with the features pursuant to the preamble of claim 1 is known from the registered documents of the German utility model G 93 17 939. In this known apparatus the flaps are pressed at the end of their linear movement by means of a lever gear perpendicular to the opening plane of the respective chamber for closure. The closure of the respective chambers perpendicular to the opening plane has already been known for a long period of time, with reference thus being made for example to the prior publications PCT/IT 86/00063 or PCT/EP 89/00797.

The mode of operation of the apparatus as known from the registered documents of the German utility model G 93 17 939.1 shall now be explained in closer detail by reference to FIG. 7. The apparatus substantially consists of a cooking chamber 1 with a cooking chamber inlet 1E and a cooking chamber outlet 1A. Above the cooking chamber 1 a portioning apparatus (not shown) is provided for charging the cooking chamber 1. A drainage chamber 2 is situated below the cooking chamber 1, the inlet of which is identical with the cooking chamber outlet 1A. A drainage chamber outlet 2A is located on the floor of the drainage chamber 2. The cooking chamber 1 can be closed in its inlet zone 1E by a linearly displaceable flap 3 and the outlet zone 2A of the drainage chamber 2 by a linearly displaceable flap 4.

The actual preparation process is as follows: After the portioned quantity of farinaceous products has been filled into the cooking chamber 1, whose outlet zone 1A has been closed, the cooking chamber 1, which is already closed in its lower zone, is closed with the help of the linearly displaceable flap 3. Fresh water is supplied to a storage container 8 by a fresh water supply means 5 via a line 6 and an opened shut-off valve 7. From there the water reaches the heating chamber 13 via a line 9 by means of a pump 10 through a check valve 11 at a predetermined pressure which can be read from a pressure gauge 12. The heating chamber 13 encompasses the cooking chamber 1 like a radial clearance. Heating rods 14 are disposed in the intermediate walls between the cooking chamber 1 and the heating chamber 13. Before the actual heating process begins the entire heating chamber 13 is filled with water and a predetermined amount of water is filled into the cooking chamber 1 by way of a filling line 15 which is equipped with a pressure control valve 16. Once the desired water level has been reached within the cooking chamber 1, the shut-off valve 15A in the filling line 15 is closed, so that the cooking chamber is shut hermetically. A flap 17 which can be pivoted about an axle is used for this purpose in its outlet zone 1A.

The overpressure prevailing in the cooking chamber 1 caused by the actual cooking process is reduced by opening the shut-off valve 22 disposed in a pressure relief line 18 which is connected via shut-off valve 19 with a waste water line 20 ending in a waste-water discharge 21 and a shut-off valve 22 and line 23 connected to the drainage chamber 2 Now the cooking chamber 1 and the drainage chamber 2 are approximately at the same pressure level. After the closure of the shut-off valve 22, one can open the flap 17 and the cooked farinaceous products fall together with the remaining cooking water into the drainage chamber 2.

A sieve 24 provided in the floor zone of the drainage chamber 2 forms the passage to line 23. After closing the shut-off valve 22 and opening the shut-off valve 25, the waste-water pump 26 ensures the drainage of the farinaceous products present in the drainage chamber 2. The sieve 24 ensures that the farinaceous products do not leave the drainage chamber 2. At the same time any overpressure present in the drainage chamber is reduced. A line 27 is used for this purpose which is connected to the fresh water line 6 by means of a shut-off valve 28 and is provided in the vicinity of its aperture into the drainage chamber 2 with a ventilation valve 29. Heat steam reaches from the drainage chamber 2 through a pre-heating line 30 to the storage container 8 and additionally heats the fresh water which will be heated later on by the heating rods 14. The pre-heating line 30 ends in the water line 20 and thus in the waste-water discharge 21. Once the farinaceous products have been separated from the cooking water, the readily prepared portion of farinaceous products can be served by means of the linearly displaceable flap 4 onto a plate or the like disposed below the drainage chamber 2.

The cross section of the cooking chamber 1 expands downwardly in a conical way. In this way any clinging of the cooked farinaceous products is prevented in this zone. In order to clean the drainage chamber 2, fresh water is conducted via line 6 into the drainage chamber 2 by opening the shut-off valve 28 after the serving of the farinaceous products and the renewed closure of flap 4. After the filling of the drainage chamber 2 and the closure of the shut-off valve 28, the shut-off valve 25 is opened and the pump 26 is activated, so that the waste water reaches the waste-water discharge 21 through the sieve 24 by way of the waste-water line 20 until the drainage chamber 2 is completely emptied.

The disadvantage in this known apparatus is that the guide means of the linearly displaceable flaps 3 and 4 must be arranged in such a way that the direction of displacement must be changed transversally to the inlet and outlet direction of the cooking chamber or the drainage chamber by 90° so as to achieve the perpendicular closing direction. This is highly complicated with respect to the guide means and additionally requires a very high contact pressure of the flap in order to ensure the tightness of the respective chamber during the occurring high pressures. In addition to the linear drive it is necessary to provide a perpendicularly acting closing force in order to achieve this objective.

From U.S. Pat. No. 3,928,045 an apparatus for the discontinuous preparation of noodles is known, with noodles that have already been readily cooked being provided in a refrigerated spiral storage means in individual containers, which noodles are then supplied on request of an operator to a heating device which will heat the already cooked, but refrigerated noodles. In this known apparatus the aforementioned problems during the cooking and draining do not occur.

SUMMARY OF THE INVENTION

The invention is therefore based on the object of arranging and further developing the aforementioned apparatus, which is described above in closer detail, for the discontinuous preparation of farinaceous products in such a way that the constructional requirements of the entire apparatus and the flap valves in particular are reduced without encountering any leakages or impairments during the operation.

This object is achieved in such a way that the linearly movable flaps are guided in lateral guide rails which are each provided with a recess whose ends are each provided with a flat bend-off and that for closing the chambers the flaps in the inlet zone of the cooking chamber and the outlet zone of the drainage chamber are pressed onto the respective openings of the respective chambers at a flat angle ($\alpha$) formed by the two directions of the recess. This type of construction ensures reliably that the apparatus in accordance with the invention can be designed in a compact size. This is of particular importance for operation with automatic machines. Moreover, only a few constructional elements are required for the flap closures.

The invention is thus based on the surprising finding that any closure of the flaps perpendicularly to the opening plane of the respective chamber is not required at all, because even a flap moved obliquely towards the opening plane can ensure the desired tightness without damaging or even destroying any existing packing elements.

Moreover, the registered documents of the German utility model G 93 17 939.1 show a portioning apparatus for the apparatus, for the discontinuous preparation of farinaceous products in which a predetermined quantity of farinaceous products has to be portioned first from a storage container for farinaceous products and thereafter is supplied to the cooking chamber. For the purpose of supplying the products, the horizontally disposed farinaceous products is pivoted by 90° so as to be supplied to the cooking chamber. It is quickly clear that, on the one hand, during the portioning and, on the other hand, during the pivoting individual noodles can be damaged or destroyed, so that further problems during the cooking process may occur. Moreover, the constructional requirements for the portioning and the supply of the farinaceous products are very high in the known apparatus.

Moreover, it is desirable that in the apparatus in accordance with the invention a reliable portioning apparatus is provided, which is easily constructed and ensures a secure supply of the raw farinaceous products to the cooking chamber without any damage or destruction occurring to individual noodles.

This is achieved in such a way that the portioning apparatus is provided with a plurality of perpendicular chambers which are arranged behind one another and can be moved over the inlet opening of the cooking chamber. In this way the mechanical portioning can be omitted and a "metering" of the portions can be made by way of the chamber size or the filling quantity. As in the portioning apparatus in accordance with the invention, there is no pivoting of the portioned quantity of raw farinaceous products, it is possible to provide an immediate charging of the cooking chamber without reversing the direction of the farinaceous products.

In a further embodiment of the invention the flat angle for closing the flaps is in a range of between 0° and 55°, preferably between 20° and 40°. As a result of the used flat angle, it is ensured that a relatively large linear movement of the flap is converted into a respectively high contact pressure. This leads to the result that even at a relatively low drive output there will be an reliable closure of the chamber which is sufficient to control the high pressures occurring during the cooking process.

In a preferred embodiment of the invention the surface of the flaps and/or of the opening zones of the chambers and/or of the guide rails consists of a hardened material. In this way it is possible to minimize the wear and tear of these zones which are subject to increased mechanical stress in order to increase the service life of the apparatus and keep the amount of maintenance and replacement parts very low.

In a further embodiment of the invention the elements of the apparatus which come into contact with the farinaceous products are surface-finished and/or surface-coated. Accordingly, components made from aluminium can be anodized. For example, it can be achieved reliably by way of a Teflon® coating that after the output of the readily prepared farinaceous products no residual farinaceous products remain in the interior of the apparatus.

A further doctrine of the invention provides that the control of the flap arranged between the cooking chamber and the drainage chamber occurs outside of the drainage chamber and that said flap is controlled by way of at least one extension of the rotational axle through the casing of the drainage chamber. As opposed to the apparatus pursuant to the registered documents of the German utility model G 93 17 939.1, the entire adjusting mechanism of the flap, which is arranged in the interior of the drainage chamber, is removed in this way from the drainage chamber, so that it is not possible for that any residual farinaceous products to cling to the control members of the flap.

Preferably, the rotational axle of the flap is extended on at least one side of the flap for its control and is controlled through a respective bore in the casing of the drainage chamber by way of a gear which is arranged outside of the casing. In a further embodiment of the invention the control occurs by way of a lever whose end is connected with a linear drive in such a way that the drive covers a large path shortly before the closing and the flap thus only performs a very small pivoting movement. It is however also possible, albeit technically more complex, to guide the rotational axle on either side out of the casing of the drainage chamber and to control it with two different levers.

For the purpose of improved sealing the flaps and/or the opening zones of the chambers can be provided with packing elements which in a preferred further embodiment of the invention are arranged in such a way that each opening zone of the chambers is encompassed by a packing element extending in manner corresponding to the shape of the opening. It is particularly favorable if the openings are provided with a circular cross section and that O-rings are provided as packing elements. The desired tightness can be achieved with this embodiment of the invention, whereby the used O-rings can be exchanged without any major effort for maintenance purposes.

The apparatus in accordance with the invention is characterized with respect to its portioning apparatus in such a way that every perpendicularly arranged chamber is provided for receiving a portioned quantity of farinaceous products. A drum magazine which can be driven stepwise and in which the chambers are arranged circularly behind one another can be provided as a portioning apparatus.

In a further embodiment of the invention the perpendicularly arranged chambers consist of hollow cylinders. These hollow cylinders favorably consist of a transparent material such as glass or plastic so as to fulfill the hygienic requirements and to display the current filling level of the entire apparatus, i,e. to show the number of the chambers that are still full.

It is also possible in accordance with the invention that the chambers are arranged in a radial clearance chamber which is formed by two concentrically arranged hollow cylinders. A number of perpendicular bridges which correspond to the number of chambers and are present between the hollow cylinders are provided to separate the individual chambers. This arrangement of a drum magazine can be manufactured particularly inexpensively and allows in addition to create chambers of different sizes by differently distanced bridges so as to provide the apparatus with varying quantities of farinaceous products. Accordingly, small and large portions of raw farinaceous products can be stored in the drum magazine so as to prepare a respective quantity of farinaceous products as is desired by the operator of the apparatus.

In accordance with the invention, the perpendicularly arranged chambers are open on the bottom and can be moved at a small distance from a sliding surface. This reliably ensures that during the rotational movement of the perpendicular chambers there will be a reliable "closure" of the chamber floor without requiring any further mechanisms for this purpose. It is particularly favorable if the perpendicular chambers are also open at the top and can be closed with a single common lid. In this way the refilling of the portioning apparatus in accordance with the invention can be performed very easily, because only one single lid has to be removed so as to fill a plurality of chambers with the raw farinaceous products.

BRIEF DESCRIPTION OF THE DRAWINGS

The invention is now explained in closer detail by reference to a drawing merely showing a preferred embodiment, wherein

FIG. 1A shows a side elevation of one of the guide rails of the invention of FIG. 1, rotated ninety degrees.

DETAILED DESCRIPTION OF THE DRAWINGS

Figure 1:
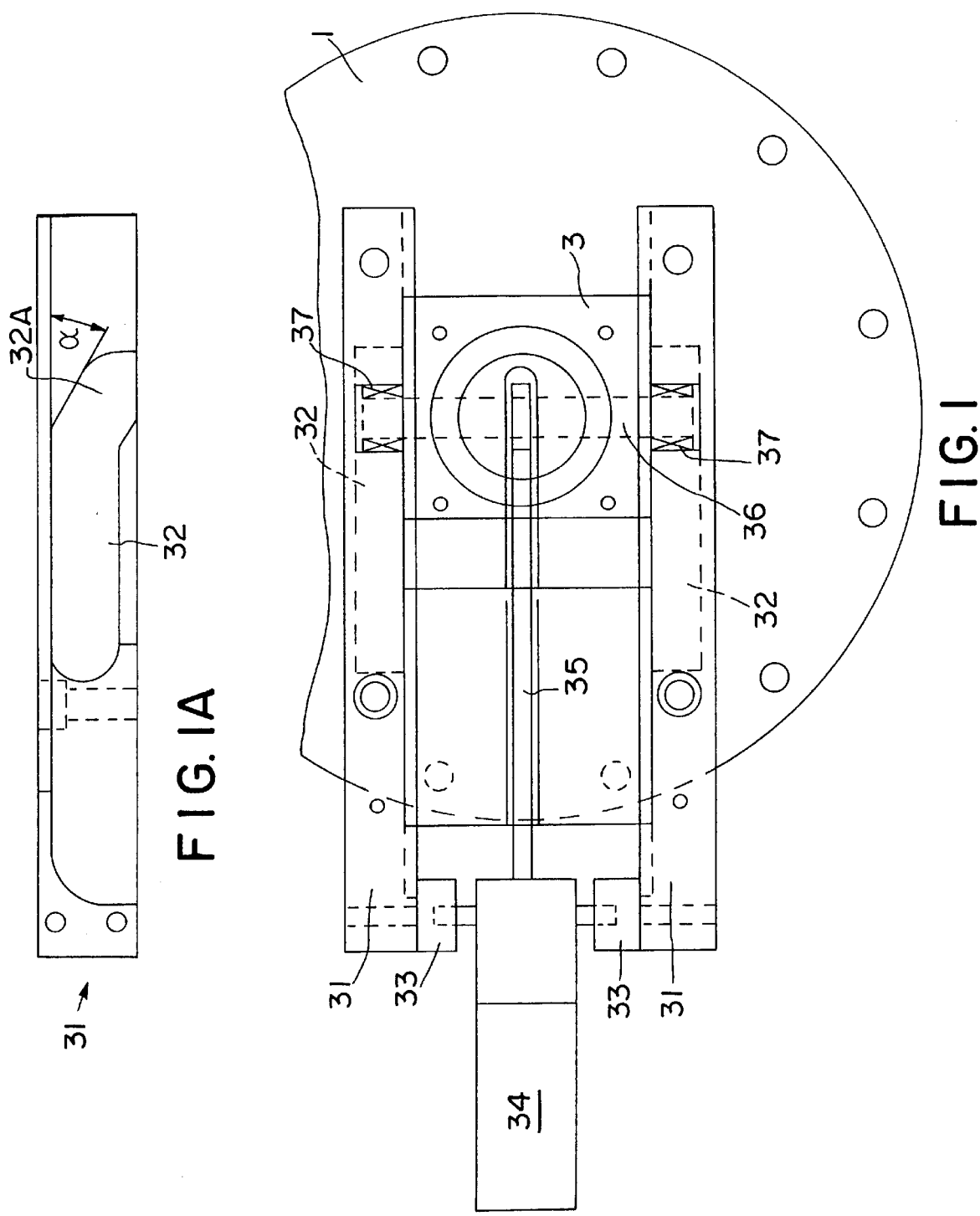
FIG. 1 shows a shut-off valve of the apparatus in accordance with the invention in a top view.

As shown, the flaps 3 and 4 are arranged nearly identically, the mode of operation shall be explained with respect to FIG. 1 only with reference to the example of flap 3. The cooking chamber 1 is represented only schematically and partly broken open. The guidance of the linearly movable flap 3 is effected by means of guide rails 31 which contain recesses 32. The ends of said recesses terminate in an angular region 32A angled towards the cooking chamber so that when closing the cooking chamber 1 in accordance with the invention the flap 3 can be pressed in the inlet zone 1E of the cooking chamber 1 at a flat angle α onto the respective opening of the cooking chamber 1.

To allow the better representation of the mode of operation of the guide rails 31, the upper area of FIG. 1 shows the guide rail 31 with the recess 32 and the flat angle α in a side view again.

In accordance with the invention the angle α for closing the chambers 1, 2 is in the range of between 0° and 55°, preferably in the range of between 20° and 40°. In the shown embodiment the angle α is approx. 30°.

FIG. 1 demonstrates that the closure of the cooking chamber 1 is possible with a small number of components. These include two guide rails 31, at the end of which there is each attached a pillow block 33 for holding a motor 34 which is preferably arranged as a linear drive. The motor 34 moves the flap 3 by means of a spindle or a rod 35 whose end is attached to the flap 3 by means of an axle 36. The axle 36 is used in addition for the lateral guidance of the flap 3 in the guide rails 31. For this purpose needle roller bearings 37 are arranged at the ends of the axle 36, the size of which corresponds to the slot width of the recess 32. As a result of the angular region 32A of the recess 32, the flap 3 is pressed onto the opening of the cooking chamber 1 under a flat angle α at the end of the closing movement without any reversal of direction being necessary. Any superimposition of drives is therefore omitted in accordance with the invention. It is understood that the contact pressure is the larger during the closure the flatter the angle α is formed.

Figure 2:
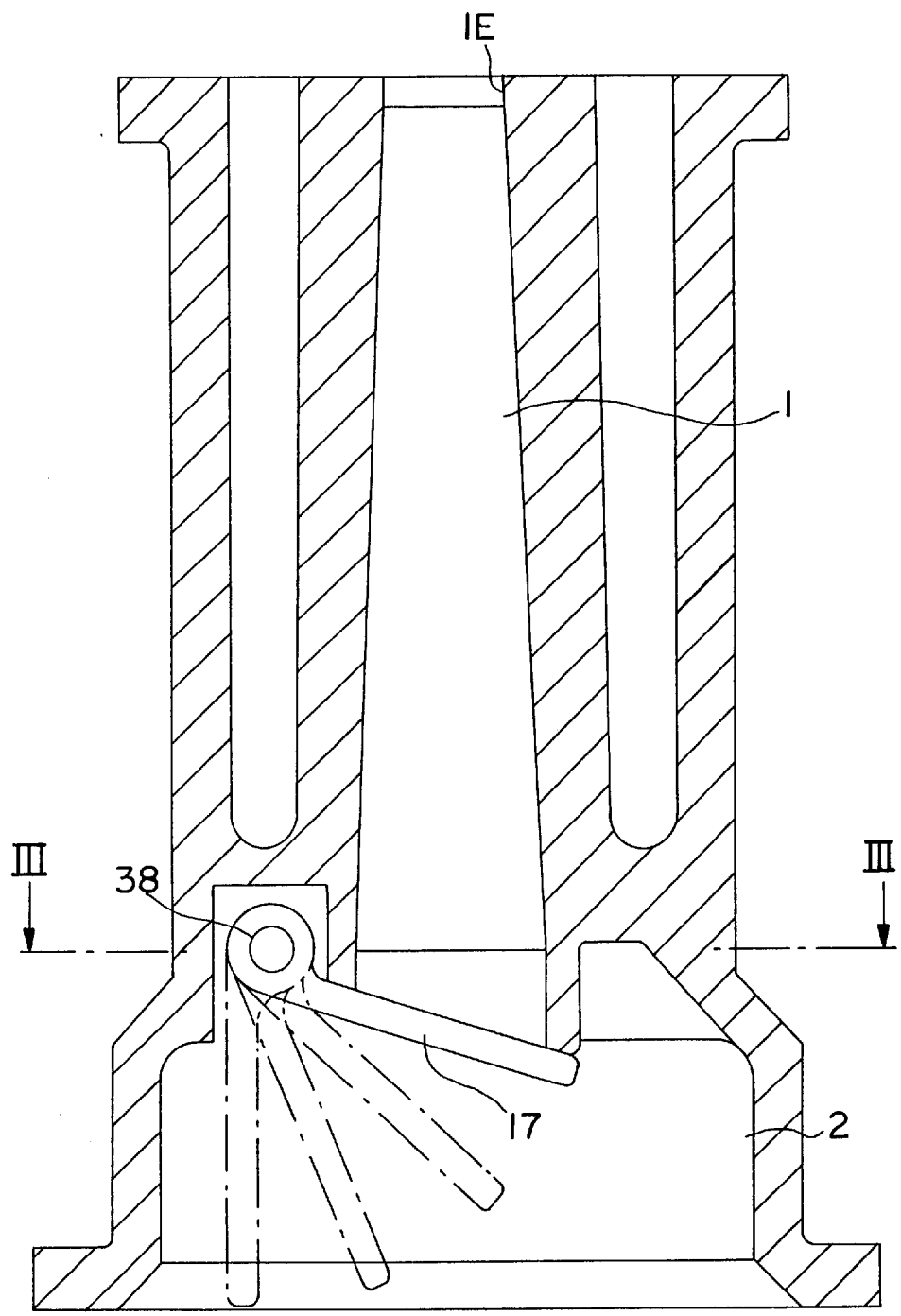
FIG. 2 shows the cooking chamber and a part of the drainage chamber of the apparatus in accordance with the invention in a vertical sectional view.

FIGS. 2 to 6 show that the control of the flap 17 arranged between the cooking chamber 1 and the drainage chamber 2 occurs outside of the drainage chamber 2 and that said flap 17 is controlled by way of at least one extension of the rotational axle 38 through the casing of the drainage chamber 2. The schematic representation in FIG. 2 shows the arrangement of the flap 17 in a vertical sectional view.

Figure 3:
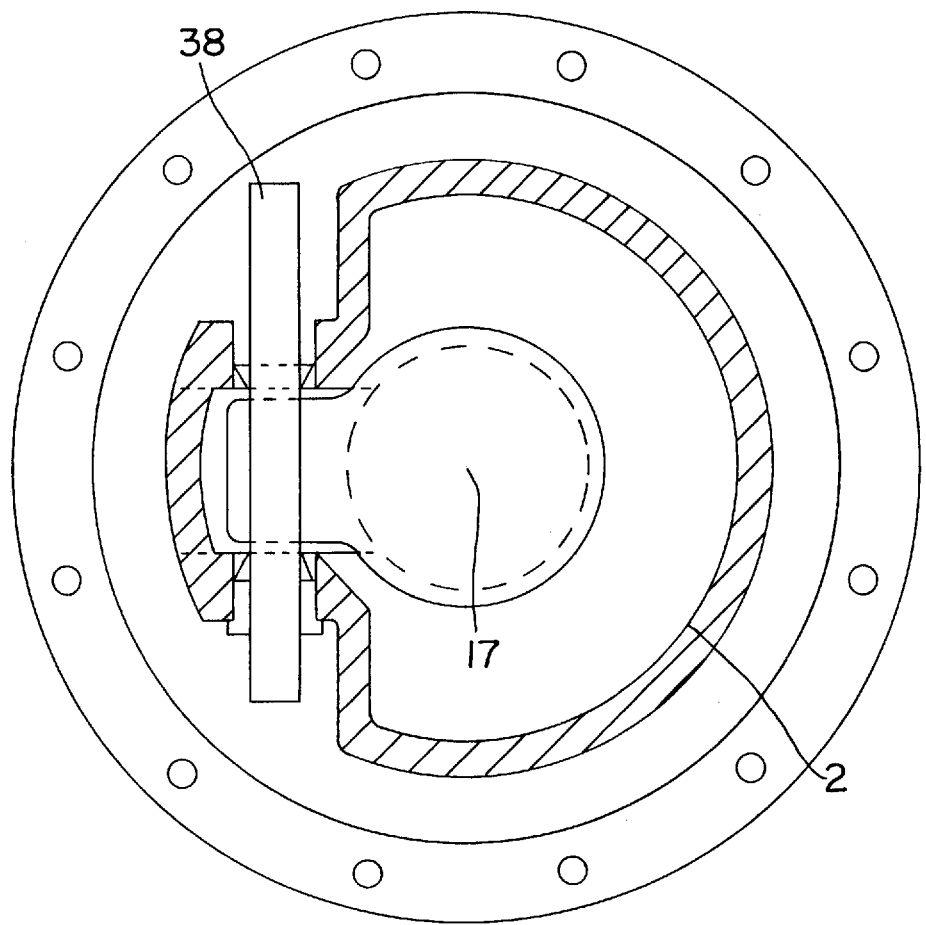
FIG. 3 shows the cooking chamber of the apparatus in accordance with the invention along the line III—III of FIG. 2.

FIG. 3 shows the control of the flap 17 by means of the rotational axle 38 in even closer detail, In accordance with the invention the rotational axle 38 of the flap 17 is controlled by way of a lever whose end is connected with a linear drive in such a way that the drive covers a large path shortly before the closure and the flap only performs a very small pivoting movement during this process. As a result of this transmission, the required force for the closure can be produced with ease. The angle between the plane of the flap 17 and the plane of the lever does not play any role, as is shown in FIGS. 4 to 6.

Figure 4:
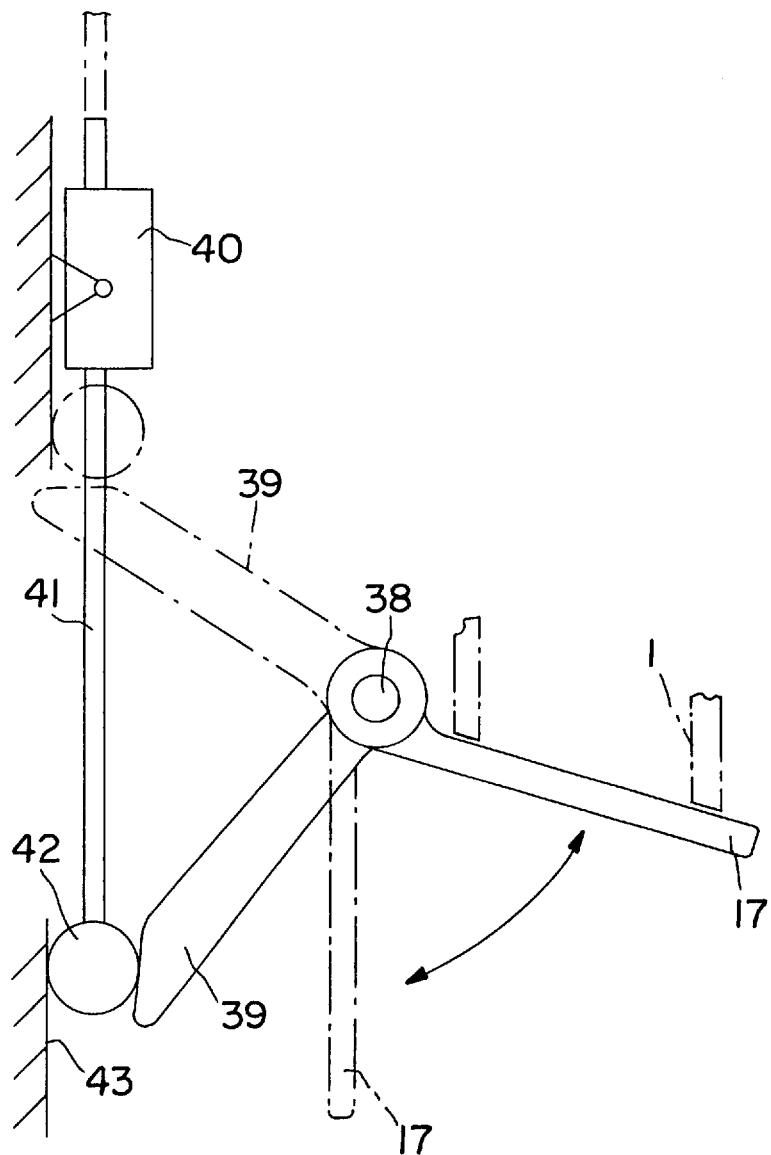
FIG. 4 shows the flap arranged between the cooking chamber and the drainage chamber in a first embodiment.

A motor 40 with a spindle 41 is provided in FIG. 4 for the drive of the lever 39, which spindle is provided at its end with a pressure element 42. The spindle 41 is extended to close the flap 17 until the pressure element 42 charges the lever 39 with pressure in the closing position of the flap 17. In the shown embodiment, which accordingly is thus preferred, the lever 39 is formed at its end in such a way that the pressure element 42 can cover a large path at a flat angle between the inclined end of the lever 39 and a stop 43 so as to exercise the required closing force on the flap 17. FIG. 4 shows in a dot-dash line the position when the flap 17 is opened and the lever 39 is in the respective upwardly pivoted position. For the purpose of opening the cooking chamber 1, the flap 17 can open by pressure or gravity or by any other suitable mechanical solution such as a spring, for example.

Figure 5:
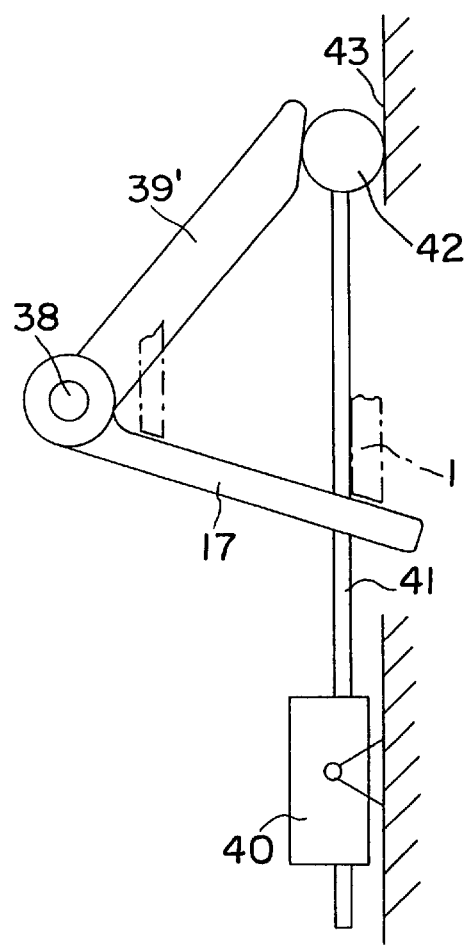
FIG. 5 shows a second embodiment of the flap pursuant to FIG. 4.
Figure 6:
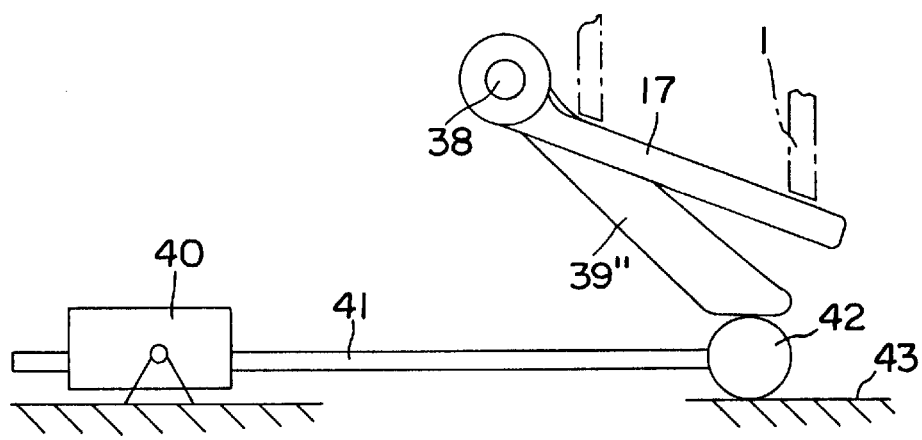
FIG. 6 shows a further embodiment of the flap pursuant to FIG. 4.
Figure 7:
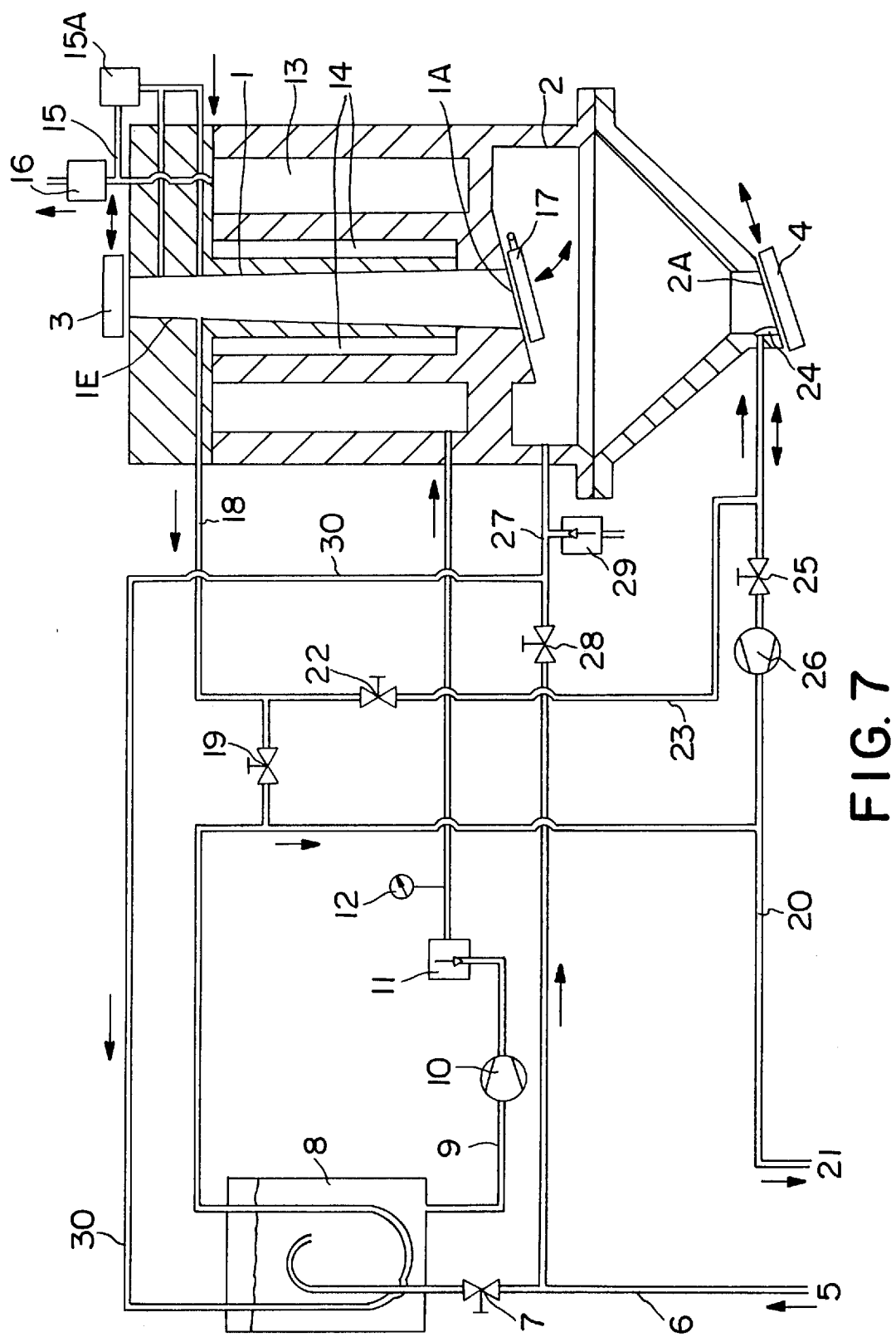
FIG. 7 shows the mode of operation of a known apparatus for the discontinuous preparation of portioned farinaceous products in a schematic representation.

FIGS. 5 and 6 correspond substantially to the construction according to FIG. 4. The only changes are those to the planes of the levers 39' and 39" shown there and also the direction of the linear drive. These examples demonstrates that the angle between the flap 17 and the levers 39', 39" can be chosen at will. In particular, the lever for closing the flap can also be arranged in the plane of the flap itself.

Figure 8:
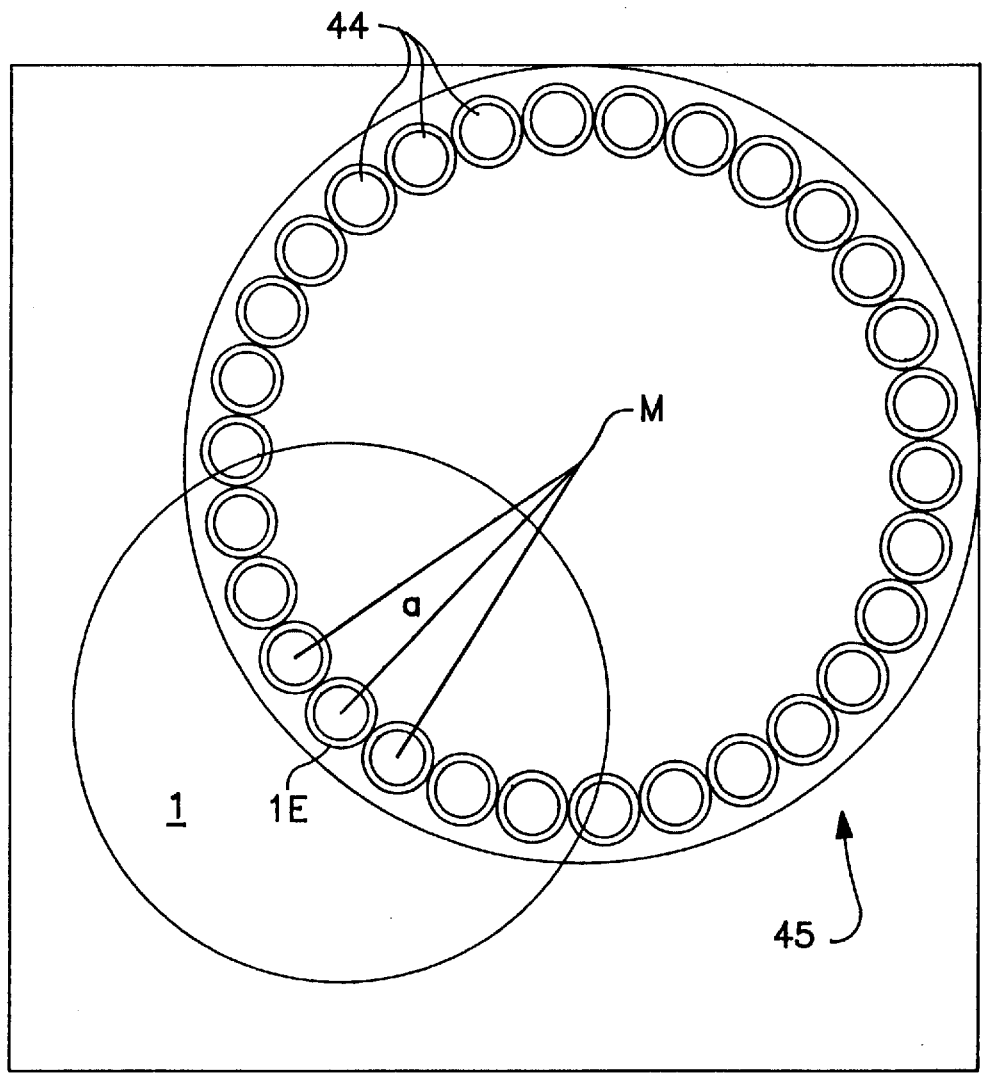
FIG. 8 shows the portioning apparatus in accordance with the invention in a schematic top view and FIG. 9 shows the portioning apparatus in accordance with the invention in a cross-sectional schematic view.
Figure 9:
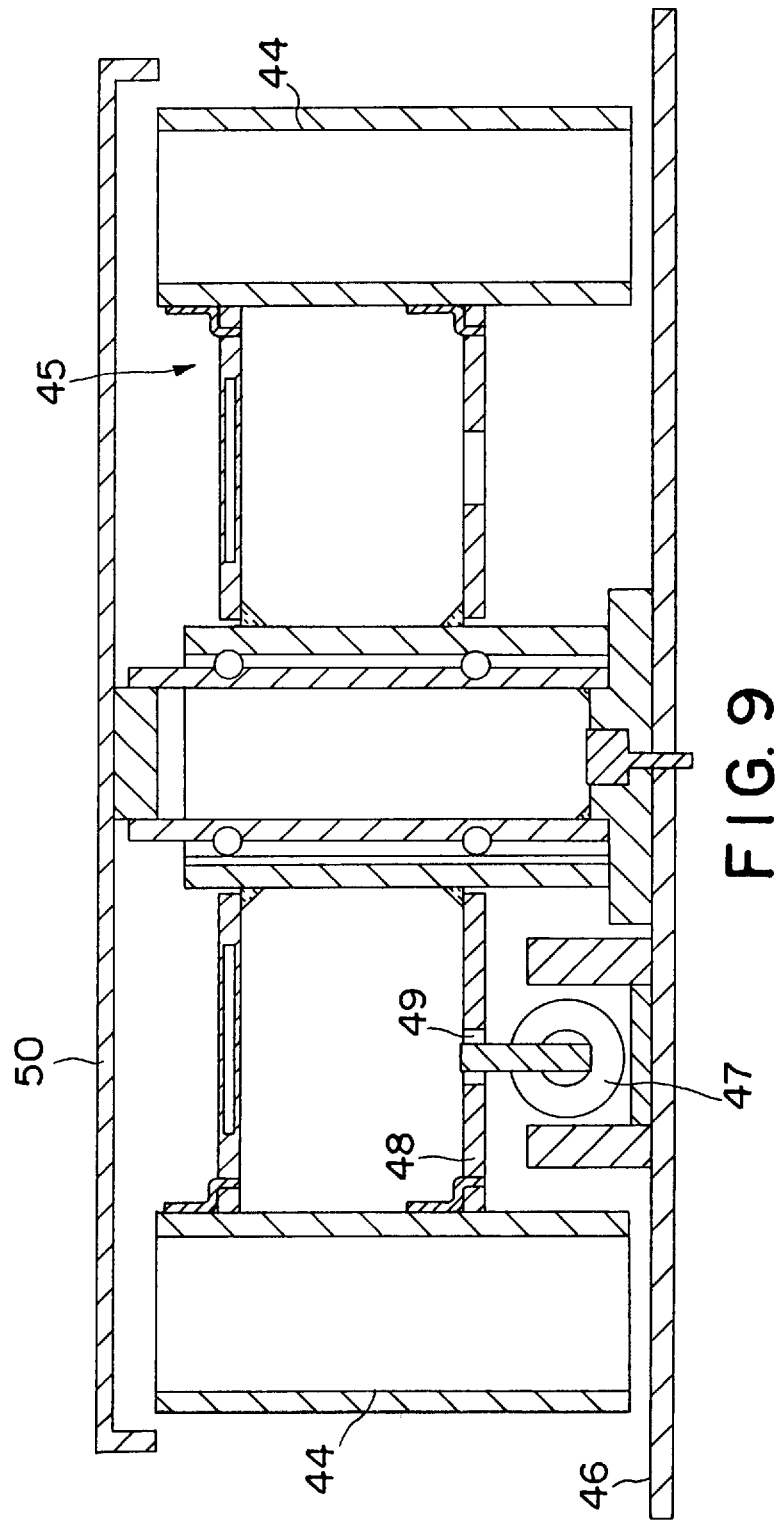

FIGS. 8 and 9 schematically show the portioning apparatus in accordance with the invention. The top view, pursuant to FIG. 8, shows that the portioning apparatus is provided with a plurality of perpendicularly arranged chambers 44, which can be moved via the inlet opening 1E of the cooking chamber 1, which is only shown schematically. Each chamber 44 is provided to receive a portioned quantity of farinaceous products. FIG. 8 shows particularly clearly that a drum magazine 45 is provided as portioning apparatus which can be driven stepwise and in which the chambers 44 are arranged circularly behind one another with the same distance from the central point M.

In the shown and thus preferred embodiment, the chambers 44 consist of hollow cylinders. It is also possible that the chambers are arranged in a radial clearance chamber formed by two concentric hollow cylinders. A number of perpendicular bridges which correspond to the number of chambers and are present between the hollow cylinders are provided to separate the individual chambers.

The function of the drum magazine 45 is shown schematically in FIG. 9. It can be seen at first that the chambers 44 are open at the bottom and can be moved at a small distance from a sliding surface 46. FIG. 9 shows the distance between the chamber 44 and the sliding surface 46 with exaggeration. The drive of the drum magazine 45 favorably occurs by way of a servomotor 47 which drives in a stepwise manner a driving chuck 48 with recesses 49 which correspond to the number of the chambers 44.

Finally, the individual perpendicular chambers 44 are also open at the top in the portioning apparatus and can be closed with a single common lid 50. The refilling of the portioning apparatus is thus very user-friendly, because merely the closed lid 50 has to be removed for refilling, which after the refilling of the chamber 44 can be placed back on the drum magazine 45, and thus constitutes both protection for the function of as well as a hygienic cover for the chambers 44.

What I claim is:

1. An apparatus for the discontinuous preparation of farinaceous products with a portioning apparatus for receiving farinaceous products, a cooking chamber (1) and a drainage chamber (2), with inlet zone (1E, 2E) and outlet zone of the cooking chamber (1) and the drainage chamber (2) each being closeable by valves which are arranged as flaps (3, 4, 17), with a single flap (17) which is rotatable about rotational axle (38) being provided between the cooking chamber (1) and the drainage chamber (2), and with flaps (3, 4) in the inlet zone of the cooking chamber (1) and in the outlet zone of the drainage chamber (2) being movable transversally to the inlet zone or the outlet zone, characterized in that the linearly movable flaps (3, 4) are guided in lateral guide rails (31) which are each provided with a recess (32) whose ends terminate in an angular region (32A) angled towards the cooking chamber (1) and that for closing the chambers (1, 2) the flaps (3, 4) in the inlet zone (1E) of the cooking chamber (1) and the outlet zone (2A) of the drainage chamber (2) are pressed onto the respective openings of the respective chambers (1, 2) at a flat angle (α) formed by the two directions of the recess (32).

2. An apparatus as claimed in claim 1, characterized in that the angle (α) for closing the chambers (1, 2) lies in the range between 0° and 55°.

3. An apparatus as claimed in claim 1, characterized in that the angle (α) for closing the chambers (1, 2) lies in the range between 20° and 40°.

4. An apparatus as claimed in claim 1, characterized in that at least one of the surfaces of the flaps (3, 4, 17), of the opening if the chambers (1, 2) and of the guide rail (31) consists of hardened material.

5. An apparatus as claimed in claim 1 characterized in that the elements of the apparatus which come into contact with the farinaceous products are at least one of surface-finished and surface-coated.

6. An apparatus as claimed in claim 1, characterized in that the control of the flap (17) arranged between the cooking chamber (1) and the drainage chamber (2) is made outside of the drainage chamber (2) and that said flap (17) is controlled by way of at least one extension of the rotational axle (38) through the casing of the drainage chamber (2).

7. An apparatus as claimed in claim 6, characterized in that the rotational axle (39) of the flap is controlled by way of a lever (39, 39', 39") whose end is connected with a linear drive in such a way that the drive covers a large path shortly before the closure and the flap (17) only performs a very small pivoting movement during this process.

8. An apparatus as claimed in claim 1 characterized in that for the purpose of improved sealing at least one of the flaps (3,4,17) and the opening areas of the chambers (1,2 ) are provided with packing elements.

9. An apparatus as claimed in claim 8, characterized in that each opening area of the chambers is encompassed by a packing element extending according to the shape of the opening.

10. An apparatus as claimed in claim 9, characterized in that the openings are provided with a circular cross section and that O-rings are provided as packing elements.

11. An apparatus as claimed in claim 1, characterized in that the portioning apparatus comprises a plurality of perpendicular chambers (44) which are arranged behind one another and are movable over the inlet opening (1E) of the cooking chamber (1).

12. An apparatus as claimed in claim 11, characterized in that each chamber (44) is provided for receiving a portioned quantity of farinaceous products.

13. An apparatus as claimed in claim 11, characterized in that a drum magazine (45) which can be driven stepwise and where the chambers (44) are arranged circularly behind one another is provided as portioning apparatus.

14. An apparatus as claimed in claim 11, characterized in that the chambers (44) consist of hollow cylinders.

15. An apparatus as claimed in claim 11, characterized in that the chambers are arranged in a radial clearance chamber formed by two concentric hollow cylinders, with a number of perpendicular bridges which correspond to the number of chambers and are arranged between the hollow cylinders being provided to separate the individual chambers.

16. An apparatus as claimed in claim 11, characterized in that the chambers (44) are open at the bottom and can be moved at a small distance to a sliding surface (46).

17. An apparatus as claimed in claim 11, characterized in that the perpendicular chambers (44) are open at the top and can be closed with a single common lid (50).

* * * * *

UNITED STATES PATENT AND TRADEMARK OFFICE
CERTIFICATE OF CORRECTION

PATENT NO. : 5,890,420
DATED : April 6, 1999
INVENTOR(S) : Hans-Ulrich Stein

It is certified that error appears in the above-indentified patent and that said Letters Patent is hereby corrected as shown below:

| | | |
|---|---|---|
| Col. 1, Line 40 | delete "An" and insert "As" |
| Col. 1, Line 51 | delete "portionied" and insert "portioned" |
| Col. 2, Line 36 | insert "." after "2" |
| Col. 7, Line 32 | delete "demonstrates" and insert "demonstrate" |
| Col. 8, Line 49 | after "axle" delete "(39)" and insert "(38)" |

Signed and Sealed this

Fourteenth Day of December, 1999

Attest:

Attesting Officer

Q. TODD DICKINSON

Acting Commissioner of Patents and Trademarks